United States Patent
Fries et al.

(10) Patent No.: US 12,129,692 B2
(45) Date of Patent: Oct. 29, 2024

(54) ACTUATING ELEMENT, IN PARTICULAR A HANDLE ELEMENT, OF AN INNER DOOR HANDLE ARRANGEMENT OF A VEHICLE AND METHOD FOR PRODUCING SUCH AN ACTUATING ELEMENT

(71) Applicant: ILLINOIS TOOL WORKS INC., Glenview, IL (US)

(72) Inventors: Elmar Fries, Röttingen (DE); Klaus Henninger, Weikersheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/328,156

(22) Filed: May 24, 2021

(65) Prior Publication Data

US 2021/0372175 A1  Dec. 2, 2021

(30) Foreign Application Priority Data

May 29, 2020  (EP) ..................................... 20177440

(51) Int. Cl.
  *E05B 85/12*  (2014.01)
(52) U.S. Cl.
  CPC .................................... *E05B 85/12* (2013.01)
(58) Field of Classification Search
  CPC .... E05B 85/12; E05B 17/004; E05B 17/0004; B29C 45/0046; B29C 45/1675; B29C 45/1615; B29L 2031/3029
  See application file for complete search history.

(56) References Cited

U.S. PATENT DOCUMENTS

| | | | |
|---|---|---|---|
| 3,677,525 A * | 7/1972 | Schurig | B05B 17/0692 239/589.1 |
| 5,129,694 A | 7/1992 | Tanimoto | |
| 6,528,158 B1 * | 3/2003 | Kuroda | G03G 15/0812 399/284 |
| 6,626,473 B1 | 9/2003 | Klein | |
| 6,929,294 B2 | 8/2005 | Byrla | |
| 7,520,543 B2 | 4/2009 | Purdy | |
| 7,527,307 B2 * | 5/2009 | Belchine, III | E05B 77/42 292/DIG. 31 |

(Continued)

FOREIGN PATENT DOCUMENTS

| | | |
|---|---|---|
| CN | 1354815 A | 6/2002 |
| CN | 101002000 A | 7/2007 |

(Continued)

*Primary Examiner* — Kristina R Fulton
*Assistant Examiner* — Thomas L Neubauer
(74) *Attorney, Agent, or Firm* — THOMPSON HINE LLP

(57) ABSTRACT

An actuating member (14), in particular a handle element, an interior door handle arrangement of a vehicle, wherein the actuating member (14) includes a carrier substrate (20) preferably made of plastic and a decorative layer (21) covering the surface of the carrier substrate (20). The decorative layer (21) includes a visible area (22) that in particular in the intended installed state, and in particular in the non-actuated state of the actuating member (14) forms a visible side of the actuating member (14), at least one gate region (2) in particular formed in a gate lip or gate tab (4), and at least one edge region or arcuate region (25, 26) by which the gate region (2) is preferably continuously connected to the visible area (22) of the decorative layer (21).

15 Claims, 4 Drawing Sheets

(56) References Cited

U.S. PATENT DOCUMENTS

| | | | |
|---|---|---|---|
| 8,113,695 B2 | 2/2012 | Meinke et al. | |
| 9,694,739 B2 | 7/2017 | Salter et al. | |
| 9,945,163 B2 * | 4/2018 | Schurig | E05B 17/0004 |
| 2004/0022988 A1 | 2/2004 | Park | |
| 2008/0018127 A1 | 1/2008 | Schindler | |
| 2010/0171324 A1 | 7/2010 | Stapf | |
| 2012/0213884 A1 * | 8/2012 | Judd | B29C 45/401 |
| | | | 425/574 |
| 2013/0240528 A1 * | 9/2013 | De Beer | B65D 51/00 |
| | | | 264/328.8 |
| 2016/0348410 A1 * | 12/2016 | Schurig | B29C 45/1679 |
| 2018/0056560 A1 | 3/2018 | Seo | |
| 2018/0179791 A1 * | 6/2018 | Kamiya | B60J 5/04 |
| 2019/0316390 A1 | 10/2019 | Wilke | |

FOREIGN PATENT DOCUMENTS

| | | |
|---|---|---|
| CN | 107743538 A | 2/2018 |
| CN | 209509794 U | 10/2019 |
| DE | 19856902 A1 | 6/2000 |
| DE | 102005022791 A1 | 11/2006 |
| JP | H1035289 | 2/1998 |
| JP | H10131550 A | 5/1998 |
| KR | 20180107427 | 10/2018 |
| WO | WO-2007134985 A2 | 11/2007 |
| WO | WO-2010066419 | 6/2010 |

* cited by examiner

ACTUATING ELEMENT, IN PARTICULAR A HANDLE ELEMENT, OF AN INNER DOOR HANDLE ARRANGEMENT OF A VEHICLE AND METHOD FOR PRODUCING SUCH AN ACTUATING ELEMENT

TECHNICAL FIELD

The present invention relates generally to interior vehicle components, and in particular to interior door handle arrangements of a vehicle. Interior door handle arrangements of the type considered herein typically include a housing and an actuating member arranged or articulated on the housing.

In particular, the present invention relates to actuating members, in particular in the form of handle elements, for an interior door handle arrangement of a vehicle as well as corresponding methods for manufacturing such actuating members.

The actuating member according to the invention can for example be a handle element. For example, this can be a handle lever mounted to pivot or articulate on a housing of an interior door handle arrangement. The actuating member can be formed to be grasped by a vehicle occupant or otherwise manipulated to open and/or close a vehicle door from the interior.

On such interior door handle arrangements, the housing and the actuating member are often made of plastic. However, for visual appearance reasons, there is often a desire for a metallic visual appearance of at least the actuating member.

For this purpose, it is generally known from the state of the art to chrome-plate the actuating member, for example the handle element of an interior door handle arrangement, or to treat surfaces in a different way. In this way, high-quality surfaces can be produced, while the base body of the actuating member provided with the chromium layer can at the same time be produced from a durable plastic. However, chromium plating, in particular using chromium IV, is problematic for health and environmental reasons.

An alternative to chromium plating is manufacturing the actuating member in an injection molding process with a plastic having a metallic visual appearance (mold-in metal color—MIMC). A visual appearance similar to chromium plating can be achieved herewith.

However, surface defects such as flow lines or voids, in particular due to the shrinkage of the material, are problematic in the MIMC process. In addition, the plastics used for this purpose are not always sufficiently durable, in particular do not always have the required maximum breaking load. This applies in the transferred sense not only to the actuating member of the interior door handle arrangement but also to the respective housing.

SUMMARY

Based on this, the invention has the object to specify an actuating member, in particular a handle element of an interior door handle arrangement of a vehicle, as well as a method for manufacturing such an actuating member, wherein this enables cost-effective, high-quality surfaces of the actuating member with considerable design freedom while also achieving good durability.

With regard to the actuating member, the problem underlying the invention is solved by the subject matter of the independent Claim 1, wherein advantageous further embodiments of the actuating member according to the invention are specified in the dependent claims.

With regard to the manufacturing method, the underlying problem of the invention is solved by the subject matter of the dependent Claim 15.

Accordingly, the invention relates in particular to an actuating member that is preferably embodied in the form of a handle element of an interior door handle arrangement of a vehicle, wherein the actuating member comprises a carrier substrate preferably made of plastic and a decorative layer at least regionally covering the surface of the carrier substrate.

According to the present invention, it is in particular provided that the decorative layer comprises a visible area that forms the actuating member's so-called "A-side", i.e., in particular forms the visible side of the actuating member in the intended installed state of the actuating member, and further in particular in the non-actuated state of the actuating member. In addition, the decorative layer comprises at least one gate region, in particular formed in a gate lip or gate tab, as well as at least one edge region or arcuate region, by which the gate region is continuously connected to the visible area of the decorative layer.

The decorative layer is preferably formed from a plastic material that can in particular be different from the plastic material from which the carrier substrate of the actuating member is formed.

In particular, the decorative layer is integrally connected to the carrier substrate, preferably in a substance-to-substance bond. At least in the installed state, the visible side of the decorative layer then corresponds to the so-called "A-side" of the actuating member and is thus at least partially directly visible from the vehicle interior. At least regionally, the decorative layer, which is preferably formed integrally with the carrier substrate of the actuating member, also extends to the so-called "B-side" of the actuating member, i.e., to the side facing away from the A-side of the actuating member.

According to the present invention, in particular at least the decorative layer of the actuating member is manufactured in an injection molding process or is connected to the carrier substrate of the actuating member. However, preferably, in particular a two-component injection molding method is used to produce the actuating member.

The solution according to the invention is in particular characterized in that the decorative layer of the actuating member comprises at least one gate region by which the heated injection molding compound is introduced into a mold cavity of an injection molding tool through at least one gate channel, wherein the mold cavity corresponds at least regionally to the shape of the actuating member and in particular to the shape of the decorative layer of the actuating member.

The at least one gate area is then in particular formed in a gate lip or gate tab, wherein the gate region is continuously connected to the visible area of the decorative layer by at least one edge region or arcuate region.

This has the advantage that no injection marking is visible on the visible side of the actuating member, i.e., on the A-side of the actuating member, due to a rear injection into the interior region of the mold body. Thus, no additional removal of the injection marking is necessary, even in the case of a subsequent external surface treatment.

Because the at least one gate region is formed in a gate lip or gate tab, wherein said gate lip or gate tab is continuously connected to the visible area of the decorative layer by at least one edge region or arcuate region, a homogenization of the heated injection molding compound can also be achieved when the heated injection molding compound is fed into the mold cavity such that the melt (the heated injection molding compound) can flow in the mold cavity from the gate region (i.e., from the gate lip or gate tab) over the at least one edge region or arcuate region to the visible area of the decorative layer at a reduced volumetric flow rate and without local densification. This achieves that the heated injection molding compound reaches the visible area of the decorative layer by at least one "gentle" transition.

By first becalming and homogenizing the heated injection molding compound in a region different from the visible area of the actuating member when introducing it into the mold cavity, and because the thus homogenized heated injection molding compound subsequently continuously reaches the area of the mold cavity that corresponds to the visible area of the decorative layer, it is possible to form the decorative layer by using a plastic material with integrated pigments without the risk of creating undesirable flow lines in the visible area of the decorative layer.

This measure must be taken into account in particular when a plastic material with embedded pigments is used to form the decorative layer, since the pigments do not form a continuum in the melt (i.e., in the heated injection molding compound). Accordingly, it is therefore necessary to ensure that the melt with the embedded pigments is not densified in the visible area of the actuating member, since a local densification of the melt would lead to a densification of the pigments, which would generate corresponding defects (in particular lines) in the finished actuating member.

By providing a gate region formed in a gate lip or gate tab that is continuously connected to the decorative layer's visible area by at least one edge region or arcuate region, a volumetric flow becalming of the melt can then be achieved when introducing the heated injection molding compound into the mold cavity, that is to say before or while the melt flows from the gate region to the visible region of the decorative layer. In this way, a higher surface quality is achieved, wherein an optionally provided surface finish can also be improved in a subsequent treatment, e.g., by painting.

With regard to the gate lip or the gate tab, in which the at least one gate region is formed, it is noted that the gate lip or gate tab represents a relatively small volume range by which the heated injection molding compound is fed into the mold cavity through corresponding gate channels.

Because said relatively small volume range that forms the gate lip or the gate tab is then by at least one edge region or arcuate region continuously connected by a volumetric flow to the region of the mold cavity that ultimately represents the visible area of the actuating member, the melt is gently redirected and evenly relaxed as the melt flows from the gate region to the visible area of the actuating member, which effectively prevents local densification of the melt in the visible area of the decorative layer.

As explained above, the interior door handle arrangement is intended for opening and/or closing a vehicle door from the vehicle interior. To this end, the interior door handle arrangement is mounted in the interior of a vehicle, such as a passenger vehicle or a commercial truck. The invention accordingly also relates to a vehicle having an interior door handle arrangement mounted therein.

The interior door handle arrangement comprises a housing by which it is attached to a vehicle door. An actuating member that a vehicle occupant can manually actuate, for example grasp, is arranged on the housing. The actuating member can be movably arranged on the housing, for example such that the actuating member can pivot or is translationally movable. The actuating member can for example be a handle element, in particular a handle lever, arranged to pivot on the housing. However, the actuating member can for example also be a button or the like actuated by a vehicle occupant. The actuating member can be formed to be actuated by a vehicle occupant to open or close a vehicle door from the interior.

In particular, the actuating member comprises a carrier substrate made of a first plastic and a decorative layer at least regionally covering the surface of the carrier substrate. The decorative layer preferably consists of a material different than the carrier substrate.

The carrier substrate carries the decorative layer, wherein the decorative layer preferably at least regionally defines the visible area of the actuating member, i.e., the area of the actuating member that is directly visible from the vehicle interior and typically faces the vehicle interior. The visible area forms the so-called "A-surface", which is subject to particularly high visual requirements.

On the other hand, the carrier substrate at least regionally forms the so-called "B surface" and can at least regionally be not directly visible from the vehicle interior. For example, the carrier substrate can be arranged on the rear face of the actuating member facing away from the vehicle interior. However, the carrier substrate can regionally also form a visible surface facing the vehicle interior that is then directly visible from the vehicle interior.

A front face of the actuating member is preferably defined by surfaces of the actuating member facing the vehicle interior when the actuating member is installed in the vehicle and is in a resting position. The boundary between the front face and the rear face of the actuating member is preferably defined by the surfaces facing parallel to the surface of the vehicle surface that directly surrounds the actuating member in a state installed in the vehicle and is in a resting position.

Preferably, a surface has a surface facing its datum line (facing outward away from the material).

Directly visible preferably means that there is no further coating (e.g., paint or chrome) or overmolding of the decorative layer. The plastic of the decorative layer is preferably the outermost surface layer of the actuating member in the area of the directly visible areas of the decorative layer.

The specification of the "first" material/plastic and the "second" material/plastic does not determine the order of their manufacturing. The invention firstly comprises the manufacturing of the carrier substrate (first plastic) and then the manufacturing of the decorative layer (second plastic), but also firstly the manufacturing of the decorative layer and then the manufacturing of the carrier substrate.

The decorative layer is in particular integrally connected to the carrier substrate, which preferably means as a substance-to-substance bond, i.e., such that they are held together by atomic or molecular forces and are inseparable, i.e., separable only by destruction. However, the meaning also comprises a positive locking connection of the decorative layer with the carrier substrate, wherein the positive locking is produced by the injection molding process within an injection molding tool. A bond by atomic or molecular forces is therefore not absolutely necessary, but rather merely preferred.

Because according to the invention, a material different than the carrier substrate is used for the decorative layer, and in particular for the visible area of the decorative layer, the carrier substrate and the decorative layer and preferably the carrier substrate and the visible area of the decorative layer can be specifically adapted to the respective requirements.

The substance-to-substance bond at the same time forms an integral component such that no additional fastening means are required to connect the carrier substrate of the actuating member to the decorative layer. This not only improves the visual appearance, but also simplifies the manufacturing and assembly of the actuating member according to the invention.

When using the actuating member, there are partially not insignificant requirements with regard to the durability, in particular the maximum breaking load. According to the present invention, these can be easily increased, namely by selecting a correspondingly durable material for the carrier substrate. At the same time, by selecting a suitable other material for the decorative layer, and in particular for the visible area of the decorative layer, a visually particularly high-quality surface can be realized without the material used for this purpose, which is often not sufficiently durable, affecting the overall durability of the actuating member.

For example, a material with a metallic visual appearance is possible for the decorative layer, and in particular for the visible area of the decorative layer. Chromium plating, which as explained is problematic for environmental and health reasons, can therefore be omitted.

The decorative layer, and in particular the visible area of the decorative layer, can have a significantly lower thickness than the carrier substrate. For example, the greatest thickness of the decorative layer can in the visible area of the decorative layer preferably be less than 50% of the smallest thickness of the carrier substrate, preferably less than 20% of the smallest thickness of the carrier substrate. As a result, the stiffness of the actuation member, which is substantially provided by the carrier substrate, can be maximized while also achieving a low propensity to surface defects of the decorative layer, in particular in the visible area of the decorative layer. In particular, when for example only one surface facing the vehicle interior is formed by the decorative layer and in particular the visible area of the decorative layer, this represents a simple geometry that can be manufactured without surface defects.

The decorative layer and preferably the visible area of the decorative layer are in particular formed by a section (gate region) injection-molded onto the carrier substrate of the actuating member.

The present invention specifies in this context that the at least one gate region by which the material necessary for forming the decorative layer (second material/plastic material) is injected into the corresponding mold cavity is formed by a region facing away from the visible area of the decorative layer, in particular in a gate lip or gate tab. The area in which the gate lip or gate tab of the at least one gate region is formed for the second material of the decorative layer is connected by a volumetric flow to the visible area of the decorative layer, wherein the area of the gate lip or gate tab is continuously enlarged as seen from the effective volumetric flow cross-section and is redirected at the transition to the visible area of the decorative layer. As already explained, homogenization and relaxation of the heated injection molding compound can be achieved in an effective manner when forming the decorative layer.

According to an embodiment with particular practical value, the actuating member can have been manufactured with a two-component injection molding method. This allows a particularly simple and cost-effective manufacturing of the actuating member.

At the same time, by combining the construction of the carrier substrate and the decorative layer according to the invention, and in particular by providing the gate region in a gate lip or gate tab in an area of the decorative layer that is continuously connected to the decorative layer's visible area by an edge region or arcuate region, surface defects can be particularly efficiently minimized when manufacturing with a two-component injection molding method. It has been shown that by providing the gate region for the decorative layer in a gate lip or gate tab that is continuously connected to the decorative layer's visible area via an edge region or arcuate region, in particular a shrinkage of the plastic material of the decorative layer can be reduced/minimized when curing the plastic material of the decorative layer, which would result in surface defects such as flow lines or voids.

By injection molding onto a carrier substrate formed from a different material, as specified in accordance with the above-mentioned embodiment of the decorative layer and preferably the visible area of the decorative layer, a shrinkage and the associated surface defects are minimized. The carrier substrate then forms a stable basis for injection molding the decorative layer and preferably the visible area of the decorative layer, which can significantly reduce shrinkage. Flow lines and voids can be reliably avoided.

At the same time, using only one injection molding tool, the aforementioned embodiment allows the manufacturing of different decorative layers, preferably visible areas, e.g., made of plastics of different colors, depending on the respective application. This further increases flexibility.

As already shown, in particular when a plastic material with embedded pigments is used as the material for the decorative layer, it is preferred that this material continuously enters the visible area of the decorative layer as a heated injection molded material (melt) as a smoothed volumetric flow.

For this purpose, it is in particular proposed that when the decorative layer is formed, a homogenization region is provided in which the plastic compound injected into the mold cavity through gate channels is first smoothed and then flows as evenly and continuously as possible into the region of the mold cavity that ultimately forms the visible area of the decorative layer on the finished actuating member.

In this context, it is in particular proposed according to the present invention that the gate region through which the heated injection molded material for the decorative layer is injected into the mold cavity is formed in a gate lip or gate tab, wherein said gate lip or gate tab is connected to the visible area of the decorative layer as a continuous volumetric flow by at least one edge region or arcuate region.

It is preferred in this case when the melt (the heated injection molding compound) can expand in the so-called homogenization region into a larger volumetric region of the mold cavity, preferably in a continuous manner.

In order to achieve this, it is provided according to embodiments of the invention that the gate lip or gate tab in which the at least one gate region is formed has an at least substantially U-shaped, V-shaped or wedge-shaped design when seen as a top view, wherein the so formed gate lip or gate tab tapers from the at least one edge region or arcuate region towards the at least one gate region.

With this embodiment of the gate lip or gate tab in which the at least one gate region is formed, it is effectively achieved that upon injecting the melt, the melt in the mold cavity expands from a relatively small volumetric region towards the volumetric region of the mold cavity that forms the visible area of the decorative layer in the finished state of the actuating member. This preferably continuous increase in volume causes volumetric flow smoothing of the melt upon its transition from the gate region to the visible area of the decorative layer.

In particular, it is advantageous to preferably form the gate lip or gate tab in which the at least one gate region is formed in an end region of the actuating member and in particular in a converging region of the actuating member.

In particular, a corner area at an end region of the actuating member, in particular an acute or wedge-shaped tapering corner region, is considered to be the "converging area" of the actuating member.

By forming the gate lip or gate tab in an end area of the actuating member, and in particular in a converging area of the actuating member, the source flow of the plastic melt can be more advantageously continuously widened when forming the visible area of the actuating member, which positively influences a homogenization of the plastic melt.

Alternatively or in addition to the aforementioned embodiment, wherein the gate lip or gate tab in which the at least one gate region is formed has an at least substantially U-shaped, a V-shaped, or wedge-shaped design as seen in a top view, it is specified that in a top view of the gate lip or gate tab, the gate lip or gate tab has two boundary lines diverging in relation to each other towards the at least one edge region or arcuate region and adjacent to the carrier substrate, which steadily converge in the area of the at least one gate region, in particular and preferably over at least one, and in particular two, curved regions with a constant curvature.

This embodiment of the gate lip or gate tab likewise achieves a suitable homogenization region in a particularly efficient yet simple manner for the heated plastic melt when forming the decorative layer of the actuating member.

In this context, it has been shown to be particularly efficient that an angle $\alpha$ is spanned between the boundary lines diverging towards the at least one edge region or arcuate region, where $90°>\alpha>10°$ applies. Of course, other angular ranges are also conceivable in this case.

Preferably, the diverging boundary lines each transition over a curved region with constant and in particular the same curvature into the at least one edge region or arcuate region. According to realizations of the actuating member according to the invention, it is provided in this case that the curvature of the curved region by which the diverging boundary line respectively transitions to the at least one edge region or arcuate region preferably corresponds to the curvature of the at least one curved region by which the boundary lines adjacent to the carrier substrate converge.

Homogenization and smoothing of the plastic melt when forming the decorative layer and, in particular, when forming the visible area of the decorative layer, in a particularly preferred manner permits that not only the volumetric area at the gate region increases towards the visible area of the decorative layer, but also that a redirection of the heated plastic melt takes place when transitioning into the visible area of the decorative layer.

For this purpose, it is preferred that the at least one edge region or arcuate region between the at least one gate region and the visible area of the decorative layer is selected such that the decorative layer is preferably continuously redirected from the at least one gate region to the visible area by an angle $\beta$ of not less than 35° and even more preferably is continuously redirected by an angle $\beta$ of not less than 45°.

Alternatively or additionally, it is provided according to embodiments of the solution according to the invention that the at least one edge region or arcuate region between the at least one gate region and the visible area of the decorative layer is selected such that the decorative layer is preferably continuously redirected from the gate region to the visible area by an angle $\beta$ not to exceed 155° and even more preferably is continuously redirected by an angle $\beta$ not to exceed 145°.

According to a preferred realization of the actuating member according to the invention, it is specified in this context that the gate lip or gate tab is formed in an area of the decorative layer that is preferably continuously connected to the visible area of the decorative layer by a single edge region or arcuate region, wherein the decorative layer is continuously redirected by the single edge region or arcuate region from the gate region to the visible area by an angle $\square$ of at least 35° and not to exceed 155°, and wherein the gate region is preferably formed by a straight-line tunnel gate.

In this context, it is preferred that the area of the decorative layer in which the gate lip or gate tab is formed has a first layer thickness B at least in the edge region or arcuate region, wherein the area of the decorative layer in which the visible area is formed has a second layer thickness A at least in the edge region or arcuate region.

In particular, the first layer thickness B should in this case be less than the second layer thickness A in order to achieve effective volumetric flow smoothing and homogenization when transitioning the heated plastic melt from the gate region to the visible area of the decorative layer.

According to implementations of the actuating member according to the invention, the second layer thickness A is preferably 0.5 mm to 3.5 mm at least at the edge region or the arcuate region, while the first layer thickness B is preferably 0.4 mm to 3.3 mm at least in the edge region or the arcuate region. Of course, other orders of magnitude are however also conceivable for the first and/or second layer thicknesses.

According to preferred further embodiments of the most recently mentioned embodiments, it is provided that the gate region is preferably at least substantially round or oval and has an average diameter C, wherein the average diameter C of the gate region is less than the layer thickness B of the area of the decorative layer in which the gate lip or gate tab is formed.

According to realizations of the most recently mentioned embodiment, it is in particular provided that the average diameter C of the gate region is preferably 0.3 mm to 3.1 mm, whereas alternatively or additionally, the layer thickness B of the area of the decorative layer in which the gate lip or gate tab is formed is preferably 0.4 mm to 3.3 mm.

According to embodiments of the actuating member according to the present invention, the gate lip or gate tab transitions to the visible area of the decorative layer by an intermediate area, wherein the only edge region or arcuate region is arranged between the intermediate area and the visible area, and wherein in the area of the gate lip or gate tab and in the intermediate area the decorative layer has a layer thickness B, which is preferably in a range between 0.4 mm to 3.3 mm.

On the other hand, according to further embodiments of the last mentioned embodiment, it is provided that the intermediate area has a length D, which is greater than the layer thickness A of the decorative layer in the visible area (at least at the edge region or arcuate region), wherein the decorative layer has a layer thickness in the visible area of preferably 0.5 mm to 3.5 mm.

These dimensions form a homogenization region in which the heated plastic melt is homogenized into a smoothed volumetric flow when forming the decorative layer in order to avoid local densification of the melt. In this way, a particularly high-quality surface quality of the decorative layer can be achieved.

According to embodiments of the actuating member according to the present invention, the gate region is formed on a side opposite to the visible area of the actuating member.

In this embodiment, in particular, the gate lip or gate tab is formed in an area of the decorative layer that is connected to an intermediate area of the decorative layer by a first edge region or arcuate region, wherein the intermediate area of the decorative layer is preferably continuously connected to the visible area of the decorative layer by a second edge region or arcuate region.

In the first edge region or arcuate region, the decorative layer is redirected by an angle γ of at least 45° and preferably by an angle γ of about 90°, wherein in the second edge region or arcuate region of the decorative layer, the decorative layer is preferably continuously redirected by an angle β of at least 35° and preferably not to exceed 155°.

In order to achieve the best possible homogenization of the melt injected through the gate region, it is preferably provided in this embodiment that the area of the decorative layer in which the visible area is formed has a layer thickness A at least along the edge region or arcuate region, wherein in the intermediate area the decorative layer has a layer thickness B at least along the edge region or arcuate region, wherein the layer thickness B is less than the layer thickness A.

It is then for example conceivable that the layer thickness B in the intermediate area of the decorative layer is between 0.6 and 1.4 mm, while the layer thickness A of the decorative layer is between 0.8 and 1.6 mm in the visible area (at least along the edge region or arcuate region).

In this way, the liquid melt expands upon transitioning from the intermediate area to the visible area of the decorative layer, as a result of which the melt is smoothed and no local densification can occur in the melt.

In this context, it is particularly preferred that the gate region is preferably formed at least substantially round or oval and has an average diameter C, wherein the average diameter C of the gate region is less than the layer thickness B of the intermediate area of the decorative layer. For example, the average diameter C of the gate region can be in a range between 0.4 to 1.2 mm.

According to embodiments of the present invention, the carrier substrate or decorative layer is produced in a first injection molding shot using a first mold half and a second mold half resulting in a first molded part. In a second injection molding shot onto the first molded part, the decorative layer or the carrier substrate is then preferably produced on an outer surface of the first molded part, namely in particular after a change of the first and/or second mold half, which results in a second molded part, while the first molded part remains in one of the first mold half and the second mold half until the second molded part has been shot onto the first molded part.

This achieves a well-defined boundary between the first and the second plastic and a particularly high-quality surface, since each of the carrier substrate and the decorative layer is shot in a geometric design optimized for this purpose and the first molded part is positioned exactly where it should be positioned as expected for the second injection molding shot.

According to embodiments, the second plastic has an increased thickness in the area where the edge region or arcuate region is formed compared to a thickness of the second plastic in a region further towards the gate region. Thus, it is possible to create an edge or arcuate region with the second material without creating an undercut. This is therefore easier to manufacture.

By providing a corresponding homogenization region for the melt of the second plastic, the quality of the surface appearance can be improved, in particular if a high-gloss and/or metallic surface appearance is desired, since the second plastic can flow over a wide surface area into the region that becomes a surface on the front face of the actuation section.

According to embodiments, the at least one edge region or arcuate region of the second plastic extending from a front face of the actuating member to the rear face of the actuating member extends over at least 25%, preferably at least 40%, preferably at least 70%, and most preferably 99% of the front face to rear face boundary of the actuating member, preferably along at least an upper region of the actuating member.

This can further enhance the appearance of the actuating member as seen from the vehicle interior, as the decorative layer extends largely rearward. For example, the fact that the actuating member is comprised of two materials may not be noticeable to an occupant of the vehicle when the upper region of the actuating member—provided it is conventionally installed in the vehicle door—is formed by the first component extending rearward.

According to preferred embodiments, the decorative layer has a constant thickness over at least 70%, preferably at least 80% of its visible area, i.e., in case of doubt with a deviation of less than 30%, preferably less than 20% of the average thickness.

This further improves the visual appearance of the decorative layer as the volumetric flow of the second plastic material is improved.

Preferably, the carrier substrate has a variable thickness, i.e., in case of doubt with a deviation of more than 30%, preferably more than 50% of the average thickness, in the areas in which the decorative layer has a constant thickness. The thickness is preferably measured from the front face to the rear face, along a surface datum line.

According to embodiments of the actuating member according to the present invention, the decorative layer has a thickness of about 70%, preferably at least 80% of its visible area, in a range of 0.5 to 3.5 mm and preferably in a range of 0.7 mm to 1.7 mm.

This further improves the visual appearance of the decorative layer as the volumetric flow of the second plastic material is improved when the decorative layer is formed. Regarding the thickness, we have determined that it should neither be smaller to avoid obstacles nor larger to avoid zebra patterns than the indicated interval, preferably even the preferred interval, to minimize the risk of these undesirable effects.

According to embodiments of the actuating member according to the invention, the decorative layer comprises a surface roughness RA of less than or equal to 2 µm, preferably less than or equal to 1.1 µm, or preferably a gloss of at least 60 gloss units measured at 60°, preferably 70 gloss units measured at 60° over 70%, preferably at least 90% of its visible area.

This further improves the visual appearance of the decorative layer. It has been found that the invention is particularly suited for high-gloss surfaces, which are very sensitive to volumetric flow turbulence and material shrinkage when forming the decorative layer.

According to a further embodiment, the decorative layer comprises at least 90%, and preferably at least 99% of the visible area of the actuating member.

Furthermore, the carrier substrate can be made of a reinforced plastic, in particular a glass fiber-reinforced plastic. Particularly good carrier properties can be achieved as a result. In principle, a wide variety of combinations of materials are conceivable for the carrier substrate and the decorative layer. Some possible combinations of materials are provided below strictly as examples:

Carrier substrate PA6 reinforced/decorative layer PA6 Décor

Carrier Substrate PA6 with Cool Touch Effect/Decorative Layer PA6 Décor

Carrier Substrate SAN Reinforced/Decorative Layer PC-ABS or ABS

Carrier Substrate POM reinforced/Decorative Layer POM Décor

According to further embodiments, the carrier substrate and the decorative layer can be made of the same plastic base material, wherein the plastic of the carrier substrate is preferably reinforced, in particular glass fiber-reinforced. In particular, a two-component injection molding process can thereby be further simplified.

Moreover, the first plastic and the second plastic may be identical, preferably both reinforced by a filler material, for example glass fibers. In this case, the surface of the decorative layer is preferably grained. There are other techniques for producing a grained, near surface actuating member, which often require gas-assisted injection molding or a specific construction of the carrier substrate to avoid solid plastic contents, which result in shrinkage that would be visible even on a grained surface. However, this new technique of a two-layer (or multi-layer) approach makes it less necessary or even unnecessary to use gas-assisted injection molding or specific designs of the carrier substrate, as the decorative layer is thin enough by itself to avoid shrinkage and is formed in a separate shot.

The decorative layer can have a color different than the carrier substrate. This achieves a particularly high level of design freedom. However, the decorative layer and the carrier substrate can generally also have the same color.

The decorative layer, and preferably the visible area of the decorative layer, can according to a further embodiment be made of a plastic with a metallic visual appearance. Such plastics with a metallic visual appearance, which can be manufactured in particular by plastic injection molding processes (Mold In Metal Color—MIMC), are well known as such. They have a surface finish similar to chromium plating, but without the environmental and health issues of chrome plating. As also explained, especially such plastics with a metallic visual appearance often do not have the required durability. This problem is solved by the structure of the actuating member according to the invention.

According to a further embodiment, the carrier substrate can at least regionally be made of a plastic with a cool-touch effect.

Mineral fillers or metal particles, in particular ferromagnetic metal particles, can be embedded in the plastic of the carrier substrate. By embedding a mineral filler or metal particles in the plastic, the cooling typically associated with metal surfaces is achieved, although a plastic material is employed, which can also be processed accordingly in a plastic injection molding process.

For example, the carrier substrate can form the rear face of the actuating member to be grasped by a vehicle occupant to actuate the vehicle door, and facing away from the vehicle interior. By being formed from a plastic with a cool touch effect, and in combination with a plastic with a metallic visual appearance forming the decorative layer that faces the front face of the actuating member facing the vehicle interior, and preferably the visible area of the decorative layer, a vehicle occupant gains the impression of a metal handle, both visually and haptically.

To increase the cool-touch effect, the carrier substrate can be made of a plastic with good thermal conductivity. A plastic in the context of this invention preferably exhibits the cool-touch effect if the value measured with the "HapTemp" device developed for this purpose by "ZIEGLER-Instruments GmbH" is equal to or less than 19, preferably equal to or less than 15. This instrument is capable of measuring an equivalent of the perceived haptic temperature, wherein steel has a value of 0, glass has a value of 10, and Teflon has a value of 20. These values are based on a "HapTemp" device from 2012 (Serial No. 12.11.1), software version 16.2.8, most recently calibrated in January 2019.

According to a further embodiment, a cavity may be formed in the carrier substrate. Plastics with a cool-touch effect or plastics with embedded mineral fillers or metal particles have a high density. In order to counteract this, a cavity can be formed in the carrier substrate. For example, in a plastic injection molding process, this may be achieved by injecting gas into the still flowable plastic to displace corresponding material. The formation of such a cavity would for example also be conceivable in a plastic such as PA6-GF30.

According to a further embodiment, the decorative layer, and in particular the visible area of the decorative layer, can be bonded to the carrier substrate with an in-mold painting method. In this context, the in-mold painting process is treated as an injection molding method. The manufacturing method generally corresponds to the two component injection molding method, wherein the cavity of the injection mold forming the decorative layer is of very low thickness. For example, this cavity can have a thickness of less than 1 mm, preferably less than 0.3 mm. The component (color) forming the decorative layer is pressed into the cavity for the decorative layer after injection molding the carrier substrate and forms a surface similar to a paint after curing. The design freedom with respect to the color of the decorative layer can thus be further increased with high surface quality.

The invention also solves the above-mentioned problem by means of a method for producing an interior door handle arrangement according to the invention, wherein the interior door handle arrangement is produced at least regionally with a multi-component injection molding method, for example with a two-component injection molding method or a three-component injection molding method. As already stated, particularly high-quality surfaces can thereby be produced with manufacturing engineering methods, while at the same time achieving high durability.

According to embodiments, the injection molding method comprises manufacturing an actuating member according to at least the following steps:

A) Manufacture one of the following:
a carrier substrate made of a first plastic, and
a decorative layer made of a second plastic in a first injection molding shot using a first mold half and a second mold half that define a first cavity, resulting in a first molded part, B) Manufacture the respective other carrier substrate and decorative layer in a second injection molding shot onto the first molded part, preferably onto an outer surface of the first molded part, after a change of the first mold half and/or the second mold half, to define a second cavity, which results in a second molded part while the first molded part remains in one of the first mold half and the second mold half until the second molded part is injected onto the first molded part, wherein the first molded part is preferably held in the respective cavity by a slider, preferably a slider that masks bores for an axis of rotation of the actuating member, or by an undercut geometry of the respective cavity, whereby the part is then preferably ejected from the mold by forced demolding mechanisms.

This makes it possible to design surfaces and parting lines between the two plastics in such a way that the visual quality of the decorative layer is improved. The method preferably comprises a further tool change in a third injection molding shot, which produces a third region by injecting a third plastic onto the first and/or second molded part, resulting in a third molded part. The third plastic is preferably a material that is softer than the first and/or second plastic and/or has the cool-touch effect. "Masking" is herein preferably defined as blocking a particular volume, while "unmasking" is defined as releasing a masked volume.

According to an embodiment of the manufacturing method according to the invention, the decorative layer is or will be at least partially visible directly from the vehicle interior and faces the vehicle interior, wherein the actuating member comprises a front face facing the vehicle interior and a rear face facing away from the vehicle interior, wherein the carrier substrate is preferably produced in the first injection molding shot and the decorative layer is produced in the second injection molding shot, wherein the second plastic is injected as follows in one among the first cavity and the second cavity that is to form the decorative layer:

A) at a location that is to become a region of the rear face of the actuating member, such that the second plastic flows along at least one concave mold edge, preferably a front edge, when installed in the vehicle below the head position of a seated driver of the vehicle, or along at least one concave arcuate mold region towards the front face of the actuation section, or B) at a location covered by a housing, e.g., by a housing wall between the vehicle interior and this location in which the actuating member is to be movably arranged.

According to an embodiment, the second plastic flows around the at least one mold edge or the at least one arcuate mold region over a width of at least 5 mm, preferably at least 10 mm.

This improves the surface quality as the flow of the second plastic is better balanced. Moreover, it is possible to hide the material of the carrier substrate for additional viewing angles or when actuating the actuating member.

According to the invention, it is in particular provided for the manufacturing process that the second plastic melt first flows through a homogenization region before it then forms the visible area of the decorative layer. This homogenization region is formed as the volumetric flow of the plastic melt is smoothed and continuously flows into the region of the cavity that forms at least the visible area of the decorative layer in the finished actuating member.

As a result, a high-gloss surface is directly achievable from the mold, and no further surface treatment is required to achieve a high quality appearance by using the special two-component design according to the invention.

BRIEF DESCRIPTION OF THE DRAWINGS

Exemplary embodiments of the invention are described in more detail below with reference to the accompanying drawings.

The drawing show in.

DETAILED DESCRIPTION

Unless otherwise indicated, the same reference symbols in the figures refer to the same objects.

Figure 1:
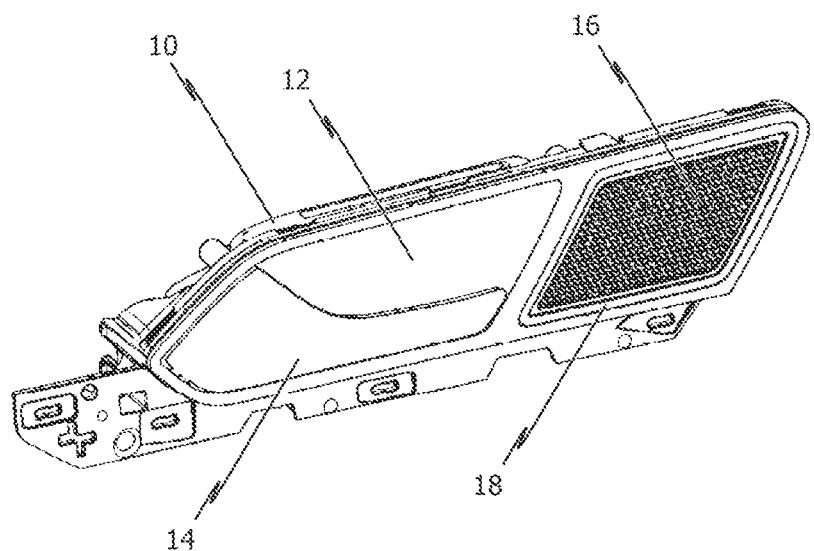
FIG. 1 a schematic illustration and an isometric view of an exemplary embodiment of the interior door handle arrangement according to the present invention.

The interior door handle arrangement shown in FIG. 1 comprises a housing 10 that allows it to be mounted to a door of a vehicle, such as a passenger car or commercial truck.

The housing 10 comprises a handle recess 12 in which an actuating member 14, in the present example a handle element 14, is received in the resting position shown in FIG. 1. From this resting position, the handle element 14 can be pivoted with its right free end in FIG. 1 out of the handle recess 12 about a pivot axis, for example a vertical pivot axis. By means of a corresponding connection, the vehicle door is unlocked by pivoting out the handle element 14 so that the vehicle door can subsequently be opened by a vehicle occupant. As the handle element 14 is pivoted out, the vehicle occupant reaches into the handle recess 12 and grasps behind the handle element 14. In the example shown, the handle element 14 forms a handle lever. A speaker 16 that is surrounded by a bezel 18 is also integrated in the housing 10.

Figure 2:
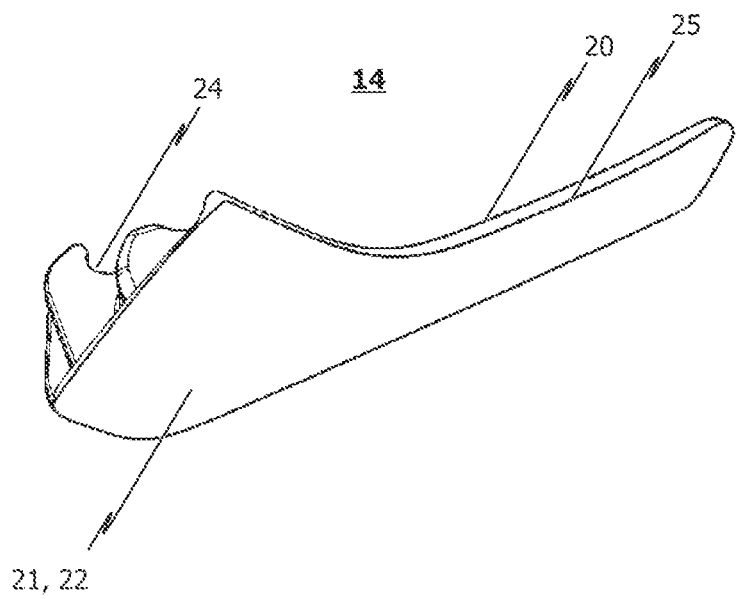
FIG. 2 a schematic illustration and an isometric view, respectively of the actuating member or handle element of the interior door handle arrangement according to FIG. 1, in an enlarged view.

In the enlarged illustration of FIG. 2, it can be seen that the handle element 14 comprises a carrier substrate 20 facing away from the vehicle interior in the resting position and a decorative layer facing the vehicle interior, preferably a visible area 22.

The carrier substrate 20 forms the rear face of the handle element 14 to be grasped behind by a vehicle occupant, and the visible area 22 of the decorative layer forms the front face of the handle element 14 that is directly visible from the vehicle interior. On its left end in FIG. 2, the carrier comprises bearing devices 24, with which the handle element 14 can be pivoted on the housing 10.

The visible area 22 of the decorative layer is connected to the carrier substrate 20 with a substance-to-substance bond. In the example shown, the visible area 22 of the decorative layer has been injected onto the carrier substrate with a two-component injection molding method.

The carrier substrate 20 is made of a plastic, for example a reinforced plastic, such as a fiberglass-reinforced plastic. The plastic can comprise an embedded mineral filler or embedded metal particles, for example ferromagnetic metal particles, such that a vehicle occupant perceives a cool surface upon grasping behind the carrier substrate 20 to pivot the handle element 14 out of the handle recess 12 of the housing 10 and thus perceiving the impression of a metal.

Accordingly, the visible area 22 of the decorative layer can consist of a plastic (mold-in-metal color—MIMC) with metallic visual appearance.

However, the visible area 22 of the decorative layer could also consist of other plastics, for example, differently colored plastics or the like. The visible area 22 of the decorative layer could also have been bonded to the carrier substrate 20 in a substance-to-substance bond with an in-mold painting method.

In the example shown, the bezel 18 of the speaker 16 has also been injected into the housing 10 with a two-component injection molding method. For example, the bezel 18 can be comprised of the material used for the visible area 22 of the decorative layer.

The decorative layer, and in particular the visible area 22 of the decorative layer, is intended to be visible at least partially directly from the vehicle interior and faces the vehicle interior, wherein the handle element 14 has a front face facing the vehicle interior and a rear face facing away from the vehicle interior.

Referring now to the illustrations in FIG. 3 through FIG. 5B, an exemplary embodiment of the actuating member or handle element 14 is described in detail.

Figure 3:
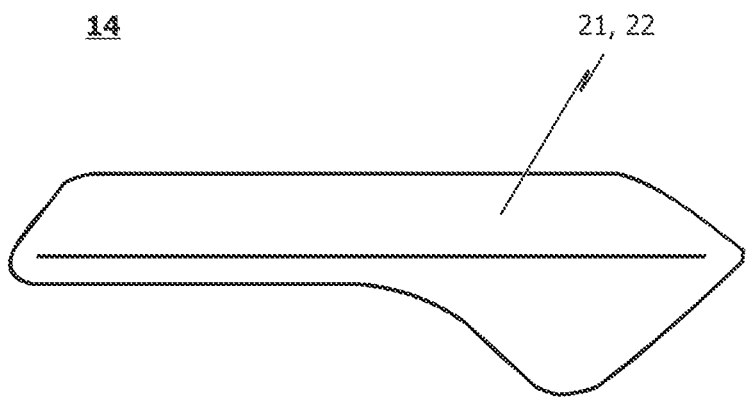
FIG. 3 a schematic illustration and a top view of the A-side of an exemplary embodiment of the actuating member according to the invention.
Figure 4:
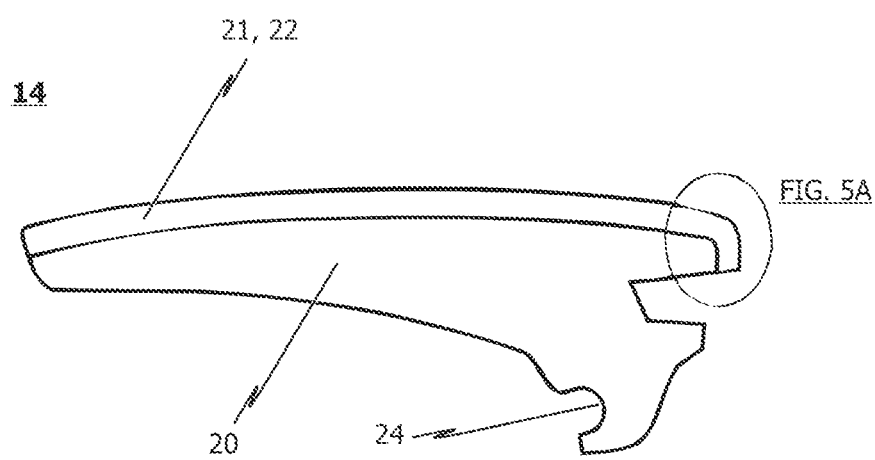
FIG. 4 a schematic illustration and a cross-sectional view of the exemplary embodiment of the actuating member according to the invention according to FIG. 3.

In detail, FIG. 3 shows a schematic illustration and a top view of the A-side of the exemplary embodiment of the actuating member or handle element 14, while FIG. 4 shows a schematic longitudinal cross-sectional view of the actuating member or handle element 14 according to FIG. 3.

As shown, the actuation member or handle element 14 according to the invention comprises a carrier substrate 20 made of a first plastic material and a decorative layer 21 covering the surface of the carrier substrate 20 at least regionally. It is in this case in particular provided that the decorative layer 21 not only comprises the visible area 22 (seen in FIG. 3), but also an edge region 23 of the actuating member or handle element 14.

Specifically, the edge region 23 is connected by an edge region or arcuate region 25 to the visible area 22 of the decorative layer 21, as can be seen from the cross-sectional view in FIG. 4.

The actuating member or handle element 14 according to this exemplary embodiment is preferably manufactured with a two-component injection molding method. It is in this case in particular provided that the plastic material of the decorative layer 21 is at least partially applied to the surface of the carrier substrate 20 and is bonded to the carrier substrate 20 in substance-to-substance bond.

In order to manufacture the actuation member or handle element 14, and in particular to form the decorative layer 21 on the regions of the surface of the carrier substrate 20, it is in particular provided that the plastic material of the decorative layer 21 is injected through gate channels as a heated injection molding compound into a corresponding mold cavity, wherein this mold cavity is regionally constrained by the carrier substrate 20 and at least one tool plate (not shown in the drawings).

To this end, an injection molding tool is used, which comprises at least one distributor channel, which leads to a gate region 2. The solution according to the invention in particular provides at least one point gate in order to form the decorative layer 21 at least regionally on the carrier substrate 20.

As will be described in more detail below, the solution according to the invention in particular provides an underfloor gate system, such as the so-called banana gate, to form the decorative layer 21 onto the carrier substrate 20, wherein the decorative layer 21 is injected such that the heated injection molding compound of the plastic material of the decorative layer 21 is homogenized and smoothed as a volumetric flow in the mold cavity corresponding to the decorative layer 21 before the heated injection molding compound reaches the area of the mold cavity that corresponds to the visible area 22 of the completed actuating member or handle element 14.

An exemplary embodiment for a possible injection is illustrated below with reference to the schematic drawings in FIG. 5A, and in FIG. 5B.

Figure 5A:
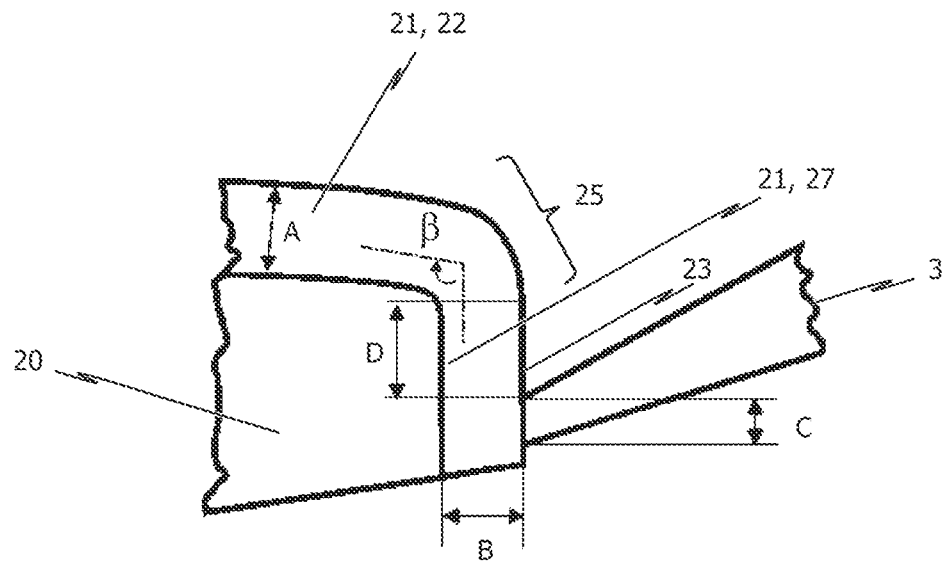
FIG. 5A a schematic illustration and a detail view of a region of the actuating member according to FIG. 4, to explain an exemplary embodiment of the gate region.

Specifically, FIG. 5A schematically shows the edge region or arcuate region 25 shown in FIG. 4 in an enlarged illustration, namely together with a gate channel 3 of the injection molding tool. The gate channel 3 in this case terminates in a region of the mold cavity that does not belong to the A-side of the actuating member or handle element 14 of the completed actuating member or handle element 14. The gate channel 3 instead terminates in a side region or edge region 23 that is connected to the visible area 22 of the actuation member or handle element 14 by the edge region or arcuate region 25.

As shown in the schematic cross-sectional view in FIG. 5A, the gate channel 3 can preferably comprise a cross-sectional shape converging in the direction of the gate region 2, such that the heated injection melt of the plastic material for the decorative layer 21 can be appropriately injected into the side region or edge region 23 of the mold cavity.

Figure 5B:
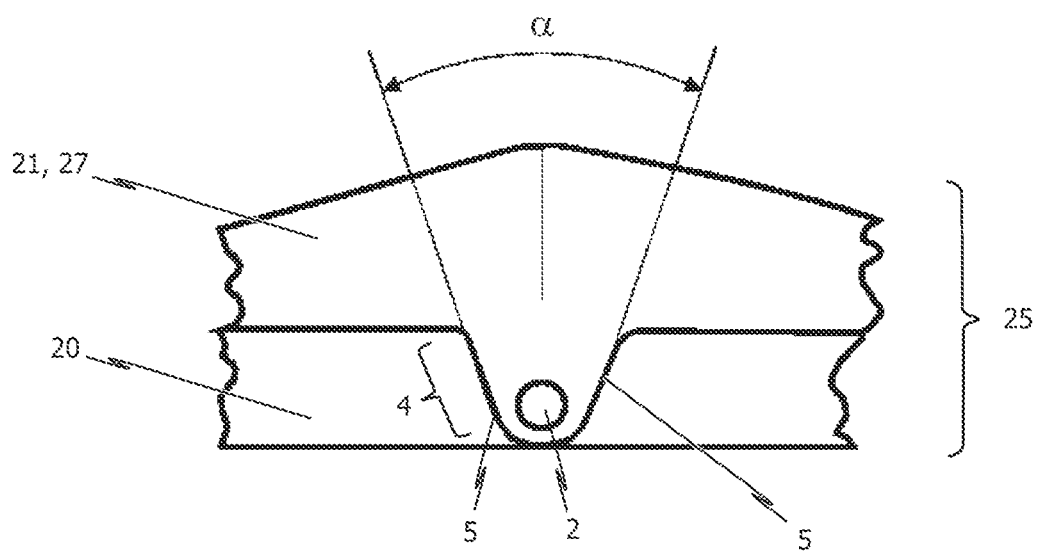
FIG. 5B a schematic illustration and a top view of the gate region in the exemplary embodiment according to FIG. 5A.

FIG. 5B shows a schematic top view of the gate region 2 of the gate channel 3 according to FIG. 5A.

Briefly summarized, it can be seen that the gate region 2 is formed in a gate lip or gate tab 4, wherein the gate region 2 is continuously connected to the visible area 22 of the decorative layer 21 by the edge region or arcuate region 25.

In particular, it is advantageous in this case that the gate lip or gate tab 4, in which the gate region 2 is formed, has an at least substantially U-shaped, V-shaped or wedge-shaped design as shown in a top view (see FIG. 5B). The gate lip or gate tab 4 in this case tapers from the edge region or arcuate region 25 towards the gate region 2.

In other words, in the top view shown in FIG. 5B onto the gate lip or gate tab 4, the gate lip or gate tab 4 comprises two boundary lines 5 diverging towards one another in the direction of the edge region or arcuate region 25 and adjacent to the carrier substrate 20, wherein the two boundary lines 5 converge in particular in a continuous manner in the area of the gate region 2.

This embodiment of the gate region 2 effectively forms a corresponding homogenization region in the mold cavity corresponding to the decorative layer 21. It is in this case advantageously provided that an angle $\alpha$ is spanned between the boundary lines 5 diverging in the direction of the edge region or arcuate region 25, wherein this angle is between 10° and 90°.

Of course, other angular ranges are also conceivable in this case.

The edge region or arcuate region 25 between the gate region 2 and the visible area 22 of the decorative layer 21 is selected such that the decorative layer 21 is preferably continuously redirected from the gate region 2 to the visible area 22 by an angle β of at least 35° and preferably by at least 45°.

In the embodiment illustrated in FIGS. 5A and 5B, the gate lip or the gate tab 4 is formed in an area of the decorative layer 21 that is continuously connected to the visible area 22 of the decorative layer 21 by a single edge region or arcuate region 25, wherein the decorative layer 21 is redirected by the edge region or arcuate region 25 from the gate region 2 to the visible area 22 by an angle of β of at least 35°. In this case, the gate region 2 is formed by a preferably straight-line tunnel gate (gate channel 3).

In order to form a corresponding homogenization region in the mold cavity that comprises the decorative layer 21 of the actuation member or handle element 14, it is preferably provided that the area of the decorative layer 21, in which the gate lip or gate tab 4 is formed, has a first layer thickness B at least at the edge region or arcuate region 25, wherein the area of the decorative layer 21 in which the visible area 22 is formed has at least an average second layer thickness A at the edge region or arcuate region 25.

In particular, it is provided that at least at the edge region or arcuate region 25, the first layer thickness B is less than the second layer thickness A. According to preferred embodiments, at least at the edge region or arcuate region 25, the second layer thickness A is preferably 0.5 mm to 3.5 mm, while the first layer thickness B is preferably 0.4 mm to 3.3 mm.

Furthermore, with regard to the most efficient homogenization of the melt of the second plastic material when it is introduced into the mold cavity, it is advantageous that the gate region 2 is preferably formed at least substantially round or oval (see the top view in FIG. 5B) and has an average diameter C, as illustrated in FIG. 5A.

The average diameter C of the gate region 2 should be less than the layer thickness B of the area of the decorative layer 21, in which the gate lip or gate tab 4 is formed.

According to conceivable realizations of the actuation member or handle element 14 according to the invention, the average diameter C of the gate region 2 is preferably 0.3 mm to 3.1 mm, while the layer thickness B of the area of the decorative layer 21 in which the gate lip or gate tab 4 is formed is preferably 0.4 mm to 3.3 mm. However, other dimensions for the respective diameters and layer thicknesses are of course also conceivable.

Figure 6A:
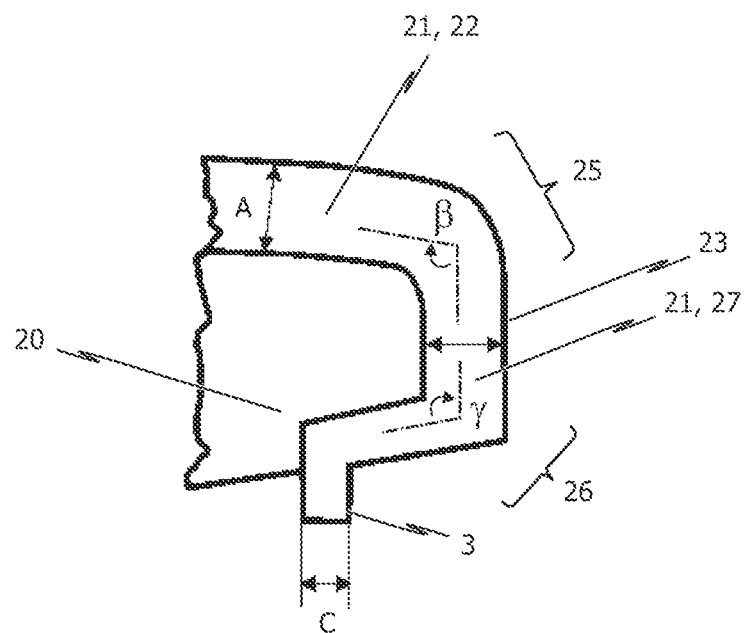
FIG. 6A a schematic illustration and a cross-sectional view of the gate region of an actuating member according to a further embodiment of the invention.
Figure 6B:
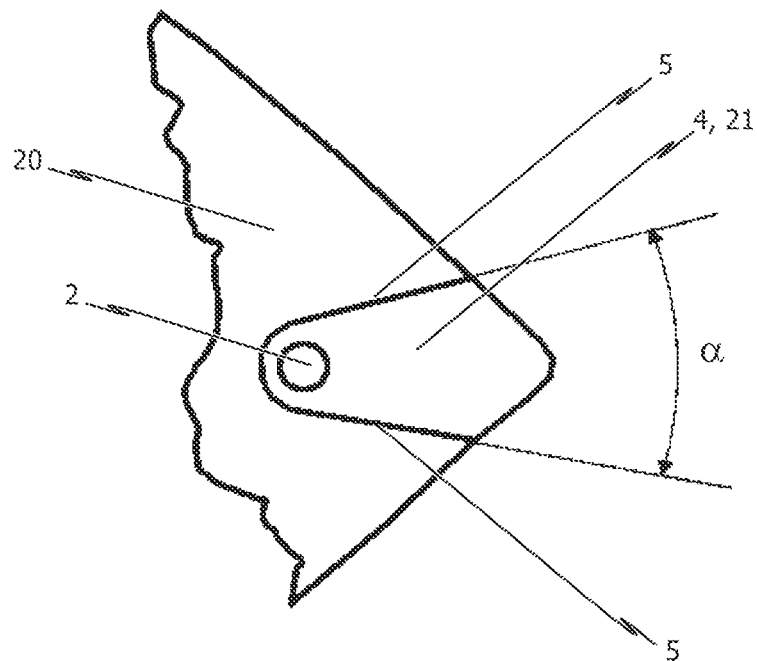
FIG. 6B a schematic illustration and a top view of the gate region according to FIG. 6A.

FIG. 6A and FIG. 6B show an alternative embodiment of the actuation member or handle element 14.

As also shown in the embodiments described with reference to the illustrations in FIG. 3 to FIG. 5B, the embodiment illustrated in FIG. 6 provides the gate region 2 for the decorative layer 21 in a region of the corresponding mold cavity that is different from the visible area 22 of the decorative layer 21.

In particular, the embodiment illustrated in FIG. 6A provides that the second plastic material of the decorative layer 21 is injected into the corresponding mold cavity through a banana gate 6.

The embodiment illustrated in FIG. 6A in particular differs from the embodiment shown in FIG. 5A in that the gate region 2 is formed in a gate lip or a gate tab 4 that is formed in an area of the decorative layer 21 connected by a first edge region or arcuate region 26 to an intermediate area 27 of the decorative layer 21, wherein the intermediate area 27 of the decorative layer 21 is preferably continuously connected to the visible area 22 of the decorative layer 21 by a second edge region or arcuate region 25. By providing such an intermediate area 27, a particularly efficient homogenization of the plastic melt can be effected when it is introduced into the mold cavity.

The first edge region or arcuate region 26 is preferably formed such that in the first edge region or arcuate region 26, the decorative layer 21 is redirected by an angle γ of at least 45° and preferably by an angle γ of about 90°, wherein in the second edge region and arcuate region 25 of the decorative layer 21, the decorative layer 21 is redirected by an angle β of 35° and by an β angle not to exceed 155°.

FIG. 6B shows a top view of the gate lip or gate tab 4 of the gate region 2 of the exemplary embodiment according to FIG. 6A.

As with the gate lip or gate tab 4 schematically shown in FIG. 5B, the embodiment according to FIG. 6B provides that the gate lip or gate tab 4 in which the gate region 2 is formed as seen in a top view, has a design that is at least substantially U-shaped, V-shaped, or wedge-shaped, wherein the gate lip or gate tab 4 extends from the first edge region or arcuate region 26 towards the gate region 2.

In detail, as seen in a top view onto the gate lip or gate tab 4 (see FIG. 6B), the gate lip or gate tab 4 has two boundary lines 5 diverging in relation to each other in the direction of the first edge region or arcuate region 26 and adjacent to the carrier substrate 20, and which continuously converge in the area of the gate region 2.

In this embodiment, it is also preferred that an angle α is formed between the two boundary lines 5 diverging in the direction of the first edge region or arcuate region 26, wherein said angle is between preferably 10° and 90°.

The actuation member or handle element 14 is preferably manufactured with a multi-component injection molding method using the following steps:

A) Manufacture the carrier substrate 20 of the first plastic in a first injection molding shot using a first mold half and a second mold half that define a first cavity, resulting in a first molded part;

B) Manufacture the decorative layer 21 in a second injection molding shot onto the first molded part onto an outer surface of the first molded part after a change of the second mold half to define a second cavity, resulting in a second molded part while the first molded part remains in the first mold half until the second molded part has been shot onto the first molded part. The first molded part is in this case preferably held in the corresponding cavity by a slider that for example covers the holes for a pivot axis of the handle element.

In the second injection molding shot, the heated injection molding compound of the second plastic is initially injected into a homogenization region in the mold cavity defined by the first molded part and the second mold half, wherein said homogenization region is selected such that a homogenization of the melt occurs and the volumetric flow of the melt is smoothed.

The plastic melt then flows over the at least one edge region or arcuate region 25 towards the visible side of the actuating member, thereby forming the plastic melt of the visible area 22.

The invention in particular introduces an interior door handle/method for manufacturing such a door handle (actuating member). The latter comprises at least two plastic layers, namely a first plastic layer formed by the carrier substrate 20 and a second plastic layer formed by the decorative layer 21, wherein both plastic layers are bonded by injection molding. The first layer forms a rear face and the second layer forms a visible front face of the actuation member or handle element 14.

It is preferable that the first layer be formed by a first tool cavity, wherein the second layer is formed onto the first layer using a modified tool cavity, while the first layer remains in a region of the first cavity.

By injecting the second layer into the tool cavity such that homogenization of the plastic melt occurs first before it flows to the visible area of the actuating member/handle element, a surface structure of the visible area of particular quality can be achieved.

The invention is not limited to the embodiments shown in the drawings, but results when all of the features disclosed herein are considered together.

LIST OF REFERENCE SYMBOLS

2 Gate region
3 Gate channel
4 Gate lip/Gate tab
5 Boundary line
6 Banana gate
10 Housing
12 Handle recess
14 Actuating member/Handle element
16 Speaker
18 Bezel
20 Carrier substrate
21 Decorative layer
22 Visible area of decorative layer
23 Edge region of decorative layer
24 Bearing device
25 Edge region/Arcuate region
26 Edge region/Arcuate region
27 Intermediate area of the decorative layer

What is claimed is:

1. An actuating member, wherein the actuating member comprises a carrier substrate made of plastic and a decorative layer at least regionally covering the surface of the carrier substrate, wherein a rear surface of the actuating member is formed by the carrier substrate and a front surface of the actuating member is formed by the decorative layer, the front surface being opposite the rear surface, wherein the decorative layer comprises:
   a visible area, on the front surface, which, in the intended installed state of the actuating member and further in the non-actuated state of the actuating member, forms a visible side of the actuating member;
   a lip or tab portion; and
   at least one edge region or arcuate region by which the lip or tab portion is continuously connected to the visible area of the decorative layer;
   wherein a surface visible boundary line is formed by peripheral portions of the decorative layer adjacent to surface visible portions of the substrate;
   wherein, as seen in a top view onto the lip or tab portion, the lip or tab portion has two surface visible boundary line sections diverging in relation to each other towards the at least one edge region or arcuate region and adjacent to the carrier substrate that converge in a direction toward a distal end of the lip or tab portion in a continuous manner and over at least two curved regions with constant curvature, such that an end part of the lip or tab portion is defined by a curved boundary region of the surface visible boundary line.

2. The actuating member according to claim 1, wherein the lip or tab portion is formed in an end region of the actuating member, and in a converging region of the actuating member.

3. The actuating member according to claim 1, wherein an angle $\alpha$ is spanned between the surface visible boundary line sections in the direction of the at least one edge region or arcuate region, wherein $90°>\alpha>10°$ applies.

4. The actuating member according to claim 1, wherein the at least one edge region or arcuate region is located between the lip or tab portion and the visible area of the decorative layer such that the decorative layer extends continuously from the lip or tab portion to the visible area over an angle $\beta$ of at least 35°.

5. The actuating member according to claim 1, wherein the lip or tab portion is formed in an area of the decorative layer that is continuously connected to the visible area of the decorative layer by a single edge region or arcuate region, wherein the decorative layer is redirected from the lip or tab portion to the visible area by the single edge region or arcuate region by an angle $\beta$ of at least 35° and no more than 155°.

6. The actuating member according to claim 5, wherein the area of the decorative layer, in which the lip or tab portion is formed, at least at the edge region or arcuate region has a first average layer thickness B, and wherein the area of the decorative layer, in which the visible area is formed, at least at the edge region or arcuate region has a second average layer thickness A, wherein the first average layer thickness B is less than the second average layer thickness A, wherein the second average layer thickness A is 0.5 mm to 3.5 mm, and wherein the first average layer thickness B is 0.4 mm to 3.3 mm.

7. The actuating member of claim 5, wherein the lip or tab portion transitions over an intermediate area into the visible area of the decorative layer, wherein the single edge region or arcuate region is arranged between the intermediate area and the visible area, wherein the decorative layer has an average layer thickness B in the area of the lip or tab portion and in the intermediate area, wherein the average layer thickness B is 0.4 to 3.3 mm.

8. The actuating member according to claim 7, wherein the intermediate area has an average length D that is greater than the average layer thickness A of the decorative layer in the visible area, wherein the decorative layer has an average layer thickness in the visible area of 0.5 mm to 3.5 mm.

9. The actuating member according to claim 1, wherein the lip or tab portion is formed in an area of the decorative layer that is connected by a first edge region or arcuate region to an intermediate area of the decorative layer, wherein the intermediate area of the decorative layer is continuously connected to the visible area of the decorative layer by a second edge region or arcuate region, wherein in the first edge region or arcuate region, the decorative layer is redirected by an angle $\gamma$ of at least 45°, and wherein in the second edge region or arcuate region of the decorative layer, the decorative layer is redirected by an angle $\beta$ of at least 35° and not to exceed 155°.

10. The actuating member according to claim 9, wherein the intermediate area of the decorative layer has an average layer thickness B, and wherein the visible area of the decorative layer at least at the edge region or arcuate region has an average layer thickness A, wherein the average layer thickness B of the intermediate area of the decorative layer is less than the average layer thickness A of the visible area of the decorative layer, wherein the average layer thickness B of the intermediate area of the decorative layer at least in the edge region or the arcuate region is in a range between 0.3 mm to 3.5 mm, and wherein the average layer thickness A of the visible area of the decorative layer at least in the edge region or the arcuate region is in a range between 0.4 mm to 3.7 mm.

11. The actuating member according to claim 1, wherein the decorative layer is formed from a plastic material having pigments embedded therein.

12. A method for manufacturing an actuation member according to claim 1, with a multi-component injection molding process,
wherein the method comprises the following method steps:
A) manufacturing the carrier substrate from a first plastic in a first injection molding shot using a first mold half and a second mold half defining a first cavity, resulting in a first molded part; and
B) manufacturing the decorative layer in a second injection molding shot onto the first molded part onto an outer surface of the first molded part after a change of the second mold half to define a second cavity, resulting in a second molded part while the first molded part remains in the first mold half until the second molded part has been shot onto the first molded part,
or wherein the method comprises the following method steps:
A) manufacturing the decorative layer from a first plastic in a first injection molding shot using a first mold half and a second mold half defining a first cavity, resulting in a first molded part; and
B) manufacturing the carrier substrate in a second injection molding shot onto the first molded part onto an outer surface of the first molded part after a change of the second mold half to define a second cavity, resulting in a second molded part while the first molded part remains in the first mold half until the second molded part has been shot onto the first molded part,
wherein in the second injection molding shot, the heated injection molding compound of the second plastic is initially injected into a homogenization region in the mold cavity defined by the first molded part and the second mold half, wherein said homogenization region is selected such that a homogenization of the melt occurs and the volumetric flow of the melt is smoothed.

13. The actuating member of claim 1, wherein an end surface interconnects the front surface and the rear surface, wherein lip or tab portion begins on the end surface and extends, via the edge region or the arcuate region, onto the front surface, wherein portions of the end surface that are outside of the surface visible boundary line are formed by the carrier substrate.

14. An actuating member, wherein the actuating member comprises a carrier substrate made of plastic and a decorative layer at least regionally covering the surface of the carrier substrate, wherein a rear surface of the actuating member is formed by the carrier substrate and a front surface of the actuating member is formed by the decorative layer, the front surface being opposite the rear surface, wherein the decorative layer comprises:
a visible area, on the front surface, which, in the intended installed state of the actuating member and further in the non-actuated state of the actuating member, forms a visible side of the actuating member;
a lip or tab portion; and
at least one edge region or arcuate region by which the lip or tab portion is continuously connected to the visible area of the decorative layer;
wherein a surface visible boundary line is formed by peripheral portions of the decorative layer adjacent to surface visible portions of the substrate;
wherein, as seen in a top view onto the lip or tab portion, the lip or tab portion has two surface visible boundary line sections diverging in relation to each other towards the at least one edge region or arcuate region and adjacent to the carrier substrate that converge in a direction toward a distal end of the lip or tab portion in a continuous manner and over at least two curved regions with constant curvature;
wherein an angle α is spanned between the surface visible boundary line sections in the direction of the at least one edge region or arcuate region, wherein $90°>\alpha>10°$ applies.

15. An actuating member, wherein the actuating member comprises a carrier substrate made of plastic and a decorative layer at least regionally covering the surface of the carrier substrate, wherein a rear surface of the actuating member is formed by the carrier substrate and a front surface of the actuating member is formed by the decorative layer, the front surface being opposite the rear surface, wherein the decorative layer comprises:
a visible area, on the front surface, which, in the intended installed state of the actuating member and further in the non-actuated state of the actuating member, forms a visible side of the actuating member;
a lip or tab portion; and
at least one edge region or arcuate region by which the lip or tab portion is continuously connected to the visible area of the decorative layer;
wherein a surface visible boundary line is formed by peripheral portions of the decorative layer adjacent to surface visible portions of the substrate;
wherein, as seen in a top view onto the lip or tab portion, the lip or tab portion has two surface visible boundary line sections diverging in relation to each other towards the at least one edge region or arcuate region and adjacent to the carrier substrate that converge in a direction toward a distal end of the lip or tab portion in a continuous manner and over at least two curved regions with constant curvature;
wherein the at least one edge region or arcuate region is located between the lip or tab portion and the visible area of the decorative layer such that the decorative layer extends continuously from the lip or tab portion to the visible area over an angle β of at least 35°.

* * * * *

UNITED STATES PATENT AND TRADEMARK OFFICE
CERTIFICATE OF CORRECTION

Page 1 of 1

PATENT NO. : 12,129,692 B2
APPLICATION NO. : 17/328156
DATED : October 29, 2024
INVENTOR(S) : Elmar Fries et al.

It is certified that error appears in the above-identified patent and that said Letters Patent is hereby corrected as shown below:

In the Claims

Column 20, Line 4 Claim 3, reads:
"wherein $90°>a>10°$"

It should read:
--wherein $90°>\alpha>10°$--

Column 22, Line 26 Claim 14, reads:
"wherein $90°>a>10°$"

It should read:
--wherein $90°>\alpha>10°$--

Signed and Sealed this
Twenty-ninth Day of April, 2025

Coke Morgan Stewart
*Acting Director of the United States Patent and Trademark Office*